US008589331B2

(12) United States Patent
Duan et al.

(10) Patent No.: US 8,589,331 B2
(45) Date of Patent: Nov. 19, 2013

(54) PREDICTING OUTCOMES OF A CONTENT DRIVEN PROCESS INSTANCE EXECUTION

(75) Inventors: Songyun Duan, Hawthorne, NY (US); Paul T. Keyser, Hawthorne, NY (US); Rania Yousef Khalaf, Cambridge, MA (US); Geetika T. Lakshmanan, Cambridge, MA (US); Davood Shamsi, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/910,573

(22) Filed: Oct. 22, 2010

(65) Prior Publication Data

US 2012/0101974 A1    Apr. 26, 2012

(51) Int. Cl.
*G06N 5/04* (2006.01)
(52) U.S. Cl.
CPC ....................................... *G06N 5/048* (2013.01)
USPC .......................................................... 706/52
(58) Field of Classification Search
USPC .......................................................... 706/52
See application file for complete search history.

(56) References Cited

U.S. PATENT DOCUMENTS

| 5,471,622 | A  * | 11/1995 | Eadline .............................. 1/1 |
| 6,807,583 | B2 * | 10/2004 | Hrischuk et al. ............... 719/318 |
| 7,053,830 | B2 * | 5/2006 | Krumm et al. ................. 342/451 |
| 7,409,676 | B2 * | 8/2008 | Agarwal et al. ................ 717/120 |
| 7,571,069 | B1 * | 8/2009 | Farkas et al. ................... 702/120 |
| 8,006,230 | B2 * | 8/2011 | Agarwal et al. ................ 717/120 |
| 8,132,180 | B2 * | 3/2012 | Agarwal et al. ................ 719/316 |
| 8,149,278 | B2 * | 4/2012 | Wren et al. ..................... 348/143 |
| 2002/0169658 | A1* | 11/2002 | Adler ................................ 705/10 |
| 2004/0263388 | A1* | 12/2004 | Krumm et al. ................. 342/451 |
| 2005/0154701 | A1* | 7/2005 | Parunak et al. .................... 707/1 |
| 2005/0270235 | A1* | 12/2005 | Krumm et al. ................. 342/451 |
| 2005/0278301 | A1* | 12/2005 | Castellanos et al. ............... 707/3 |
| 2005/0278705 | A1* | 12/2005 | Castellanos et al. .......... 717/128 |
| 2008/0130951 | A1* | 6/2008 | Wren et al. ..................... 382/103 |
| 2009/0012928 | A1* | 1/2009 | Lussier et al. ................... 706/59 |
| 2009/0171999 | A1* | 7/2009 | McColl et al. ................. 707/101 |
| 2010/0010940 | A1* | 1/2010 | Spyropoulos et al. .......... 706/12 |
| 2010/0114629 | A1* | 5/2010 | Adler et al. ....................... 705/7 |
| 2010/0169026 | A1* | 7/2010 | Sorenson et al. ............... 702/20 |
| 2010/0265951 | A1* | 10/2010 | Fujita et al. .................... 370/392 |
| 2011/0078426 | A1* | 3/2011 | Stoitsev ......................... 712/244 |
| 2012/0022844 | A1* | 1/2012 | Teixeira .......................... 703/11 |
| 2012/0066166 | A1* | 3/2012 | Curbera et al. ................. 706/52 |
| 2012/0101974 | A1* | 4/2012 | Duan et al. ..................... 706/52 |
| 2012/0323827 | A1* | 12/2012 | Lakshmanan et al. .......... 706/12 |

\* cited by examiner

*Primary Examiner* — Kakali Chaki
*Assistant Examiner* — Fuming Wu
(74) *Attorney, Agent, or Firm* — F. Chau & Associates, LLC; William J. Stock, Esq.

(57) ABSTRACT

A method for predictive analytics in a semi-structured process including receiving traces of the semi-structured process, at least one of the traces including a document content value, determining a process model from the traces, the process model comprising tasks at nodes of the semi-structured process and embodies all possible execution sequences in the process, determining a probabilistic graph including a probability at each of the tasks of the semi-structured process advancing from one task to another task, and combining the process model and probabilistic graph to determine a probabilistic process model including probabilities and strengths of transitions between tasks.

16 Claims, 4 Drawing Sheets

FIG. 1 set of parallel tasks
{ {b, c}, {c, d}, {c, e} }

PREDICTING OUTCOMES OF A CONTENT DRIVEN PROCESS INSTANCE EXECUTION

CROSS-REFERENCE TO RELATED APPLICATIONS

This application herein incorporates by reference U.S. application Ser. No. 12/879,747, filed Sep. 10, 2010, in its entirety.

BACKGROUND OF THE INVENTION

1. Technical Field

The present disclosure generally relates to predictive analytics for document content driven processes.

2. Discussion of Related Art

Semi-structured processes are emerging in industries such as government, insurance, banking and healthcare. These business or scientific processes depart from the traditional structured and sequential predefined processes. The lifecycle of semi-structured processes is not fully driven by a formal process model. While an informal description of the process may be available in the form of a process graph, flow chart or an abstract state diagram, the execution of a semi-structured process is not completely controlled by a central entity, such as a workflow engine. Case oriented processes are an example of semi-structured business processes.

Case executions within a process are typically non-deterministic, driven by human decision making, and the contents of documents. In particular there is no single formal process model that drives the lifecycle of case-oriented business processes. The lifecycle of semi-structured processes is not fully driven by a formal process model.

Known methods of process mining do not have a way to dynamically and automatically update an existing process model. Rather these methods continually mine a formal process model from case oriented process data. Some process mining methods require explicit "change logs" to allow a process model to change.

According to an embodiment of the present disclosure, a need exists for predictive analytics for document content driven processes.

BRIEF SUMMARY

According to an embodiment of the present disclosure, a method for predictive analytics in a semi-structured process including receiving traces of the semi-structured process, at least one of the traces including a document content value, determining a process model from the traces, the process model comprising tasks at nodes of the semi-structured process and embodies all possible execution sequences in the process, determining a probabilistic graph including a probability at each of the tasks of the semi-structured process advancing from one task to another task, and combining the process model and probabilistic graph to determine a probabilistic process model including probabilities and strengths of transitions between tasks.

According to an embodiment of the present disclosure, a method for predictive analytics in a semi-structured process includes receiving traces of the semi-structured process, at least one of the traces including a document content value, determining a process model from the traces, the process model comprising tasks at nodes of the semi-structured process and assigns semantics to the nodes and edges connecting the nodes, determining a probabilistic graph including a probability at each of the tasks of the semi-structured process advancing from one task to another task, combining the process model and probabilistic graph to determine a probabilistic process model including probabilities and strengths of transitions between tasks, determining a probability distribution at a decision node based on available document contents at that decision node, wherein the probability distribution gives a probability of the semi-structured process advancing from a task corresponding to the decision node to one or more children tasks, and updating the probabilistic process model using probabilities derived by the probability distribution and predicting one of a subsequent task in an execution the process given a current task or any task in the process given the probabilistic process model.

According to an embodiment of the present disclosure, a method for updating a probabilistic process model of a process includes receiving the probabilistic process model and at least one probability distribution corresponding to a decision node of the probabilistic process model, receiving a status and content of an executing case instance of the process, and updating at least one probability of the probabilistic process model using the probability distribution.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a data structure that represents a mined process model with probabilities on each edge, referred to herein as a Probabilistic Process Model (PPM), enables understanding of the execution of cases and predictions for the likelihood of different outcomes in the data structure.

According to an embodiment of the present disclosure, a PPM may be built and mined for prediction probabilities. The probabilities may be updated with each incoming case trace.

This provides a dynamic and adaptive representation of a process that is well suited to case oriented semi-structured processes and that is amenable to incremental updates. A process model component of the PPM captures the logical structure in the process such as loops, parallelism, joins and splits. The probabilities in the PPM provide guidance on the likelihood and strength of transitions between process states that can be leveraged for predictions. The probabilities in the PPM can be updated in many different ways including using Ant Colony Optimization techniques that have been demonstrated to be useful for stochastic time-varying problems. Further, new PPMs may be mined to adapt to structural changes in the process.

The PPM is a combination of a process model (PM) and a probabilistic graph (PG).

Figure 2:
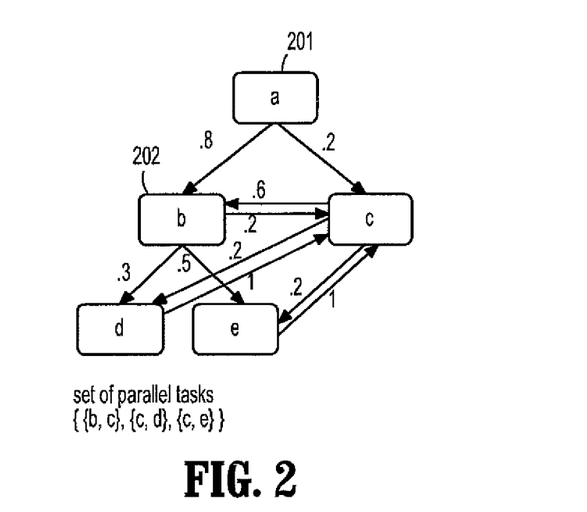
FIG. 2 is a probabilistic graph according to an embodiment of the present disclosure.
Figure 3:
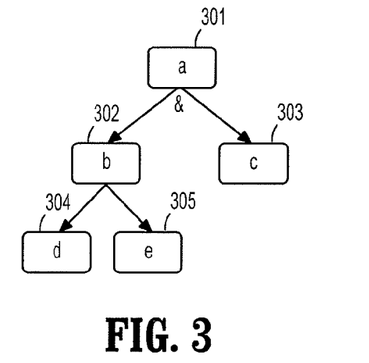
FIG. 3 is a process model according to an embodiment of the present disclosure.

The probabilistic graph is a directional graph with tasks as nodes. There is an edge from node "a" to node "b" if sequence "ab" is observed in the past event logs. At each node, transition probabilities are assigned to all outgoing edges. Transition probabilities at each node are summed up to one. In view of the foregoing, the probabilistic graph describes probabilities of going from one task to another task. However, it does not capture the structure of the process. For example, if there are parallel tasks in the process model, they are shown as loops of length 2. In FIG. 2 tasks "b" and "c" (201 and 202) are parallel, but it cannot be observed from the PG; FIG. 3 is the underlying process model. Extra edges in the probabilistic graph cause impossible paths in the process model. For example, since "a" and "b" are parallel, both should be executed in any case. However, path "abe" is a valid path in the PG.

The process model describes the structural behavior of the process. The process model describes parallelism (AND-split, AND-join), sequential paths (XOR), etc. FIG. 3 is a process model obtained from the same event logs as the mined probabilistic graph of FIG. 2. In FIG. 3, the and-sign (&) at the output of task "a" 301 that means task "b" 302 and task "c" 303 are parallel. However, task "d" 304 and task "e" 305 are not parallel (they are exclusive) and after performing task "b", one of them is performed. Formally the process model may be defined as follows:

A directed graph G(V,E) such that there is a start node "i" with no incoming edge and there is an end nodes "e" with no outgoing edge. Each node has input gate and output gate. The input and output gates can be XOR or AND gates.

Figure 4:
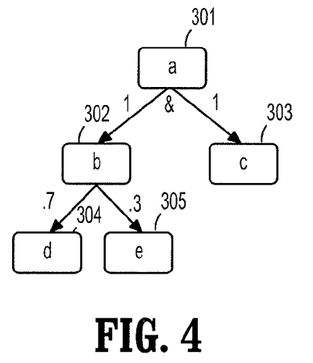
FIG. 4 is a Probabilistic Process Model according to an embodiment of the present disclosure.

In view of the foregoing, the PPM is a combination of a process model and probabilistic graph such that transition probabilities are added to the edges of the process model. For example in FIG. 4, after task "b" 302, task "e" 305 is done with probability 0.3 and task "d" 304 is done with probability 0.7. Note that at task "a" 301, there are two parallel paths without any choice. Thus, both edges are marked with probability of 1.

The PPM may be obtained from either a probabilistic graph or process model. In the case of obtaining the PPM from a probabilistic graph, parallel edges and structures of the process model are detected. In the case of obtaining the PPM from a process model, transition probabilities are added. That is, the structure of the process (e.g., parallelism) is detected and equipped with transition probabilities within the process model. Process mining may be used for both cases.

Figure 1:
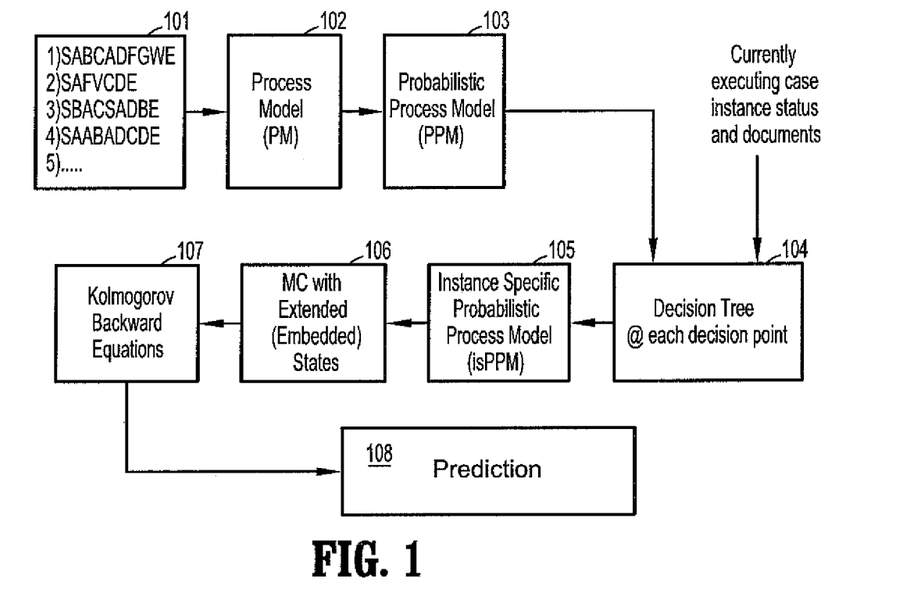
FIG. 1 is a flow diagram of a method for predicting outcomes at any stage of a content driven process instance execution according to an embodiment of the present disclosure.

According to an embodiment of the present disclosure and referring to FIG. 1, given correlated process execution logs or traces of a semi-structured process 101, a process model 102 corresponding to process the may be mined. A method for mining the process model may be considered in two phases. In a first phase parallel tasks are detected using stochastic characterizations of loops and parallel tasks. In a second phase, invisible gates are recursively detected in the input and the output of the tasks.

It is assumed that a provenance-based system collects case history from diverse sources and provides integrated, correlated traces where each trace represents the end-to-end execution of a single case including contents of documents accessed or modified or written by each activity in the trace.

According to an embodiment of the present disclosure, it may be assumed that a provenance-based system collects case history from diverse sources and provides integrated, correlated case instance traces where each trace represents an end-to-end execution of a single case including contents of documents accessed or modified or written by each activity in the trace. The correlated case instance execution traces are used as input of predictive analytics for case-oriented semi-structured processes. It should be understood that methods described herein are applicable to partial traces in cases where end-to-end execution data is not available. For example, in a currently executing business process, the outcome of the business process can be predicted based on the contents of documents currently available and known thus far, as well as traces of previous execution instances of the business process. In particular underlying methods, such as decision trees and Markov Chain rule, do not require all data variables to be initialized in order to make a prediction for the business process instance that is currently executing.

Provenance includes the capture and management of the lineage of business artifacts to discover functional, organizational, data and resource aspects of a business. Provenance technology includes the automatic discovery of what actually has happened during a process execution by collecting, correlating and analyzing operational data. The provenance technology includes the identification of data collection points that generate data salient to operational aspect of the process. This requires understanding a process context. Information and documentation about operations, process execution platforms, and models help determine the relevant probing points. A generic data model that supports different aspects of business needs to be in place to in order to utilize the operational data. The collected data is correlated and put into the context in order to have an integrated view.

Referring to the correlated traces, let T be the set of all tasks in the logs and t be a trace in the log; e.g., t is a finite sequence of tasks in T. The i-th element of the trace t is denoted by $t_i$. The set of all traces is represented by L.

A directed graph G(V,E) is constructed based on the observed traces 101. Set of nodes, V, is defined to be set of all tasks in the logs, T; and there is an edge between tasks "a" and "b" if there is a trace t in T such that $t_i$=a and $t_{i+1}$=b. The constructed graph, G, is called a process graph, which provides information about the relationships between various tasks in the process.

Once a correlation has been determined it may be used to predict the outcome of an activity instance based on the contents of the documents it has access to. The probabilistic graph is used automatically determine the decision nodes (e.g., activities where decisions are made) in a case management scenario, and use the decision tree method to learn the circumstances under which document contents accessed by a particular decision point would lead to different outcomes.

For an end-to-end prediction. given a probabilistic graph, document content is determined for each trace, decision points in the probabilistic graph are determined, prediction target nodes in the probabilistic graph are determined, and if a valid prediction target is determined, predictions are made on current document contents. A valid node has an edge connected to the decision node in the probabilistic graph. If a probabilistic graph is determined to be available, transition probabilities may be updated prior to determining the document data.

If there is no parallel task, the process graph can precisely describe structure of the process model 102. However, existence of parallel tasks adds a dimension of complexity in the determination of a correct process model 102. When tasks "a" and "b" are parallel, they can be executed in any order. Thus, it is likely that an edge exists from "a" to "b" and another edge from "b" to "a". Typically there is a bi-direction edge between two parallel tasks in the process graph while there is no causal relationship between two tasks.

Loops having a length=2 are another situation that bi-directional edges arise. Consider a 2-loop between tasks "c" and "d". After executing task "c", task "d" may be executed or vice versa. Again tasks "c" and "d" may appear in traces in any order and there will be a bi-directional edge between "c" and "d". However, the bi-directional edge here is a valid edge and it is part of the process model.

One challenge in process mining is to differentiate between two parallel tasks and a loop of length two (both introduce bi-directional edges in the process graph). A stochastic characterization of a loop and parallel task may be used to determine a bi-directional edge is a 2-loop or it is caused by two parallel tasks (and it should be deleted). In particular, the following probabilities may be utilized:

$x=P$ (task "a" is observed in a trace after "b" is observed|task "b" is observed)

$y=P$ (ask "a" is observed in a trace after "a" and "b" are observed|tasks "b" and "a" are observed)

$z=P$ (task "b" is observed in a trace after "a" is observed|task "a" is observed)

$w=P$ (ask "b" is observed in a trace after "a" and "b" are observed|tasks "b" and "a" are observed)

"x" is the probability of seeing "a" after "b"; if "a" and "b" are parallel then this probability is 1 and if they are in a 2-loop "x" is a real value between 0 and 1. The second number, "y", is the probability of observing "a" after observing "a" and "b". If "a" and "b" are parallel (and there are not in a bigger loop) then "y" should be zero; otherwise, y should be equal to x. In other words, "x" and "y" are close when "a" and "b" are in a loop. "z" and "w" have similar interpretation. The following exemplary measure may be used to determine how close these probabilities are:

$$g = x/y + y/x + z/w + w/z$$

If "x=y" and "z=w" then g is the minimum possible value (e.g., 4). A threshold "h" may be defined such that if "g≥h" then "a" and "b" are parallel and g<h they are in a 2-loop. Note that in ideal setting, when the two tasks are parallel, g is infinity and when they are constructing a loop "g=4".

The above for probabilities can be approximated with the empirical values from the trace logs, L.

$x \approx$ #(task "a" is observed in all traces after task "b" is observed)/#(task "b" is observed)

$y \approx$ #(task "a" is observed in all traces after tasks "b" and "a" are observed)/#(after tasks "b" and "a" are observed)

$z \approx$ #(task "b" is observed in all traces after task "a" is observed)/#(task "b" is observed)

$w \approx$ #(task "b" is observed in all traces after tasks "b" and "a" are observed)/#(after tasks "b" and "a" are observed)

Knowing the parallel tasks in the process graph, the type of the input and output gates types in the process graph are determined. If a node has two outgoing edges and the corresponding tasks are parallel, then the output gate is "AND".

Figure 5A:
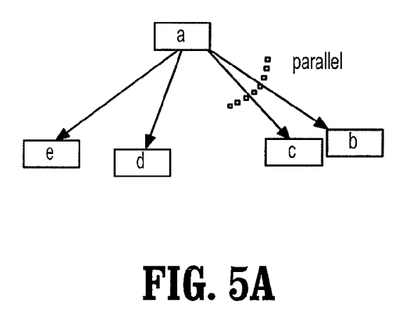
FIGS. 5A-B illustrate a determination of the type of the input and output gates types in a process graph according to an embodiment of the present disclosure.
Figure 5B:
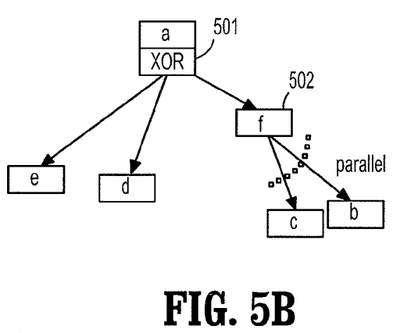

Similarly, when two tasks corresponding to outgoing edges are not parallel, the output type may be set as "XOR" as shown in FIG. 5A-B. However, the outgoing edges may have a more complex structure. For example, consider the outgoing edges of node "a" in FIG. 5A. After executing task "a", then task "e", OR ELSE task "d", or ELSE tasks "c" and "b" in parallel should be executed. It is not possible to represent the outputs of tasks "a" as a simple "XOR" or "AND" gate. A recursive scheme may be used to detect and represent the complex input/output combinations.

More particularly, let "O" be set of all outgoing edges of a task. Partition "O" into "k" subsets "O1, O2 . . . Ok" such that there is a "XOR" or "AND" relation between the subsets. For example in FIG. 5A-B, set of all outgoing edge is "O={e, d, c, b}" and partition it into three sets, "O1={c, b}", "O2={d}", "O3={e}", with "XOR" relation.

Attempt to partition set "O" into subsets with "XOR" relation. If successful, then mark output of the task as "XOR" and add an invisible task to each cluster with more than one member. FIG. 5B shows how the output gate of the node "a" is marked as "XOR" 501 and invisible node "f" 502 is added.

To find such a partition, start with an empty partition O. Next, randomly choose an edge, t, from "O" and remove it from "O"; if "t" is not parallel with any of the nodes in partition O then add the single subset {t} to the partition sets. If "t" is parallel with one of nodes in a subset in O then add "t" to that subset. This procedure may be repeated until O is empty. Finally, check that there are no two parallel tasks in two different sets of the partition. The pseudo code of the algorithm is depicted below.

Algorithm 1: Partitioning the output set into "XOR" subsets

Figure 6:
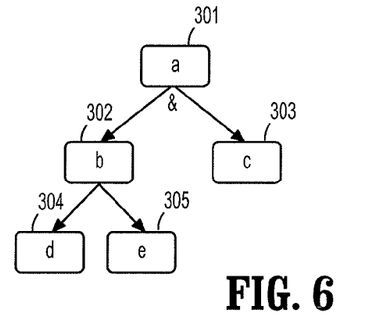
FIG. 6 is an exemplary partitioning of the process model of FIG. 3 into subsets according to an embodiment of the present disclosure.

Input:
    1-O: set of outgoing edges
    2-Set of parallel tasks
Output: a partition on O with "XOR" relation between the subsets
  I- Set O = ϕ
  II- While O ≠ ϕ
    a. t ← a random element of O
    b. O ⇐ O \ {t}
    c. If "t is not parallel with any $r \in O_l \in O$" then
        O ⇐ O ∪ { {t} }
    d. If "$\exists O_k \in O$ such that t is parallel with at least one member of $O_k$" then $O_k \Leftarrow O_k \cup \{t\}$
  III- If $\forall t \in O_k, r \in O_l$   $l \neq k$, task "t" is not parallel with task "r" then O return as the final partition; else return FAIL FIG. 6 is an exemplary output of Algorithm 1 given the process model shown in FIG. 3.

If set "O" cannot be partitioned into subsets with "XOR" relation, then try the "AND" relation. Finding partitions with "AND" relation between the subsets is similar to the previous algorithm and can be found in Algorithm 2.

Algorithm 2: Partitioning the output set into "AND" subsets

Input:
    1-O: set of outgoing edges
    2-Set of parallel tasks
Output: a partition on O with "AND" relation between the subsets
  I- Set O = ϕ
  II- While O ≠ ϕ
    a. t ← a random element of O
    b. O ⇐ O \ {t}
    c. If "t is parallel with any $r \in O_l \in O$" then O ⇐ O ∪ { {t} }
    d. If "$\exists O_k \in O$ such that t is not parallel with at least one

| Algorithm 2: Partitioning the output set into "AND" subsets |
| --- |
| member of $O_k$" then $O_k \Leftarrow O_k \cup \{t\}$<br>III- If $\forall t \in O_k, r \in O_l \quad l \neq k$, task "t" is parallel with task "r"<br>then return O as the final partition; else return FAIL |

Note that in the above algorithms, a random element of the set "O" is selected. Following a predefined order for selecting elements of "O" may result in failure in both "AND" and "XOR" detection algorithms.

Algorithms 1 and 2 may be applied to all of the nodes with more than one outgoing edges. Algorithm 3 shows how to use Algorithms 1 and 2 to determine output gates of all nodes.

| Algorithm 3: Determining output gates of all nodes |
| --- |
| I- While "there is a node with undetermined output gate and more than 1 outgoing edges"<br>  a. a = a node with undetermined output gate and more than 1 outgoing edges<br>  b. Partition the output set of "a" into "XOR" subsets (Algorithm 1)<br>  c. If (I.a) return a partition with more than one set, mark output gate of "a" as "XOR" and add new task for each partition with more than one element<br>  d. If (I.a) fails, partition the output set of "a" into "AND" subsets (Algorithm 2)<br>  e. If (II.a) return a partition with more than one set, mark output gate of "a" as "AND" and add new task for each partition with more than one element<br>  f. If #iteration > THRESHOLD then RETURN FAIL |

Algorithms 1 and 2 can be applied to identify parallel versus exclusive joins in the process model if their input set is changed to set of all incoming edges. Given the probabilistic graph, decision nodes may be treated separately. Given the document-driven nature of case executions, it would be useful to provide users with insight into how the contents of the documents (e.g., case files containing customer order details) they currently have access to in a case management system affect the outcome (e.g., future activities) of the activity they are currently involved in.

Case history may be leveraged to understand the likelihood of different outcomes at specific points in a case's execution, and how the contents of documents influence the decisions made at these points.

Assume a case with some documents associated to it (documents may be empty). A decision tree is fit to each decision node 104. Based on the decision tree output, update PPM 105. Since the resulting PPM is not a Markov Chain (MC), it is not possible to use available techniques to predict the future of the case. Construct an extended Markov Chain based on PPM and use the extended Markov Chain for prediction 106.

Figure 7:
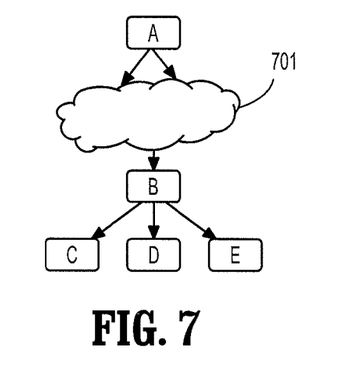
FIG. 7 illustrates fitting a decision tree to each decision point according to an embodiment of the present disclosure.

More particularly, in block 104 of FIG. 1, assume, for a specific case, state (task) "a" that state "b" is an arbitrary decision point in the PPM (FIG. 7). Based on the available case documents 701 at "a", learn a decision tree (DT) for output of node "b" (e.g., using a C4.5 algorithm). Assume that, based on the case documents, decision tree (DT) predicts that "c" from "b". This prediction may not be 100% true and in practice, the process may go from "b" to "d". Based on the Table 1 (given by J48) if decision tree (DT) predicts "c" from "b", then with probability of 0.81, a process proceeds to "c" with "d" and E having probabilities of 0.14 and 0.05, respectively.

TABLE 1

|  | C | D | E |
| --- | --- | --- | --- |
| DT predicts "c" | 81% | 14% | 5% |
| DT predicts "d" | 10% | 70% | 20% |
| DT predicts "e" | 3% | 6% | 91% |

The above procedure explains how to update the probabilities on the PPM. An updated PPM may be based on the available documents at the moment.

Referring to block 106, a method may predict the probability that task "e" will be done in future if task "c" is done. Since the PPM is not a Markov Chain, the question may not be meaningful.

Figure 8:
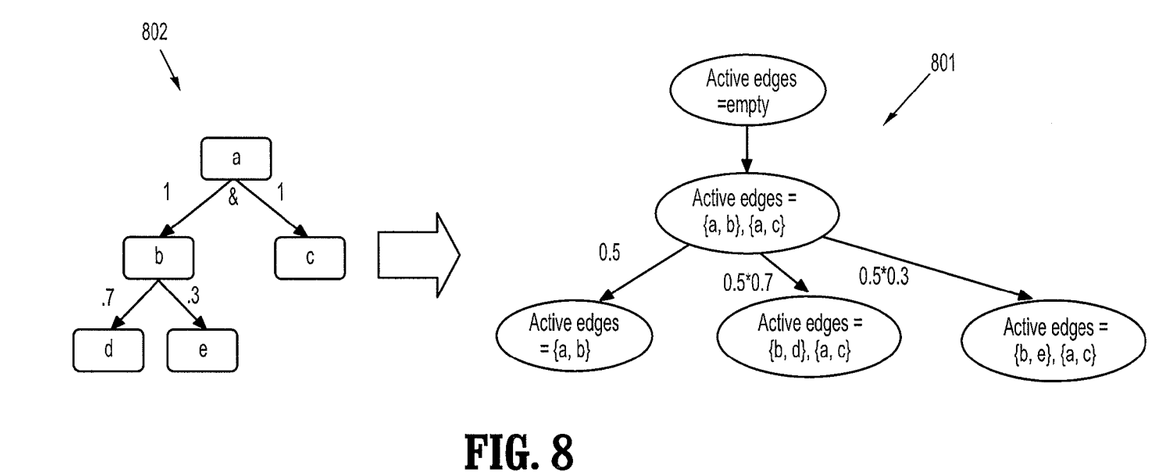
FIG. 8 illustrates extending a Probabilistic Process Model to a Markov Chain according to an embodiment of the present disclosure.

For example, consider a PPM as given in FIG. 8 and two cases: (1) abc, and (2) abdc. Here, one may wish to predict whether "d" happens after "c". Based on FIG. 8, in case (1), "d" occurs after "c" with a probability of 0.7. In case (2) it is not possible to visit "d" after "c". To alleviate this problem, an extended Markov Chain 801 is constructed based on the given PPM 802. The Markov Chain describes relations between different states of the case. Using an extended Markov Chain, the probability that each task will be done in future may be predicted.

Assigning probabilities to decision nodes: When there is an in-execution case and it is not complete, the future tasks that will be executed depend on the decision points in the process model. Thus, for a given case instance, a probability of taking each possible path after the decision point should be estimated.

Let task "a" be a decision point, a task with "XOR" in the output gate, and tasks "b" or "c" follow after "a"; predict a probability of executing "b" and "c" after "a". Here, note that transition probabilities depend on the available documents of the case instance.

Figure 9:
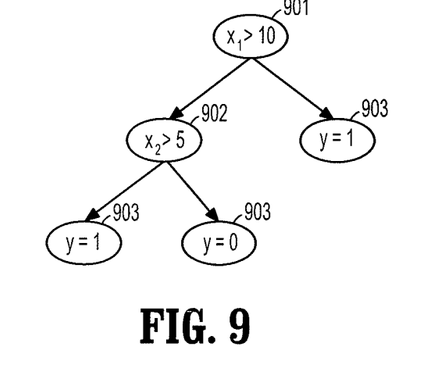
FIG. 9 is an exemplary decision tree according to an embodiment of the present disclosure.

Decision trees are well known classification methods in the machine learning literature. Assume you want to classify a data set with variables (attributes) $(x_1, x_2 \ldots x_n)$. The training data set has the form of $(x_1, x_2 \ldots x_n, y)$; where "y" is class of the instance. The goal is to classify instance $(x_1, x_2 \ldots x_n)$ based on the training dataset. Decision trees provide a classification method that each node represents a condition on one variable. For a given instance $(x_1, x_2 \ldots x_n)$, one should start from the root node and traverse the tree based on conditions at each node until he/she reaches a leaf. FIG. 9 is an example of a decision tree; values of x1 901 and x2 902 determine class of the instance (y) 903.

There are well-known methods for learning a decision tree from the dataset, for example, the C4.5 algorithm. C4.5 algorithm recursively chooses attributes for the nodes of the tree such that (normalized) entropy of the classes ("y") in divided sets is minimized.

Decision tree learning algorithms such as C4.5 can identify important attributes of the dataset. They put important attributes (in terms of classification) in higher lever nodes of the tree and they ignore irrelevant attributes. Thus, if case history includes many documents that are irrelevant for a specific decision point in the process model, the irrelevant documents are simply ignored and complexity of the system would be reduced significantly.

Execution of a case involves many nondeterministic factors such as human decisions, unknown documents, and unknown facts about the case; thus, it might not be possible to fit exact decision trees to decision points. In the other word, decision trees learned based on the case history would not always be able to predict the correct outcome. However, for a given case instance, a probability distribution over possible outcomes can be inferred form the decision tree. These distributions may be used for obtaining a PPM that is case specific.

Note that decision trees are learned based on the case history and they do not change in the next steps. However, for each case instance (dataset), a specific probability distribution can be inferred from the decision trees.

Decision trees are just learned at the decision points of the process model (tasks in the process model with XOR gate in the output gate). There is no choice in the tasks with "AND" output gate; all the subsequent talks should be executed.

Referring to block 106 of FIG. 1, the PPM includes parallel tasks. The mined PPM can be transformed to a Markov chain. The Markov chain with an extended state space can be decomposed to smaller Markov chains.

Figure 10:
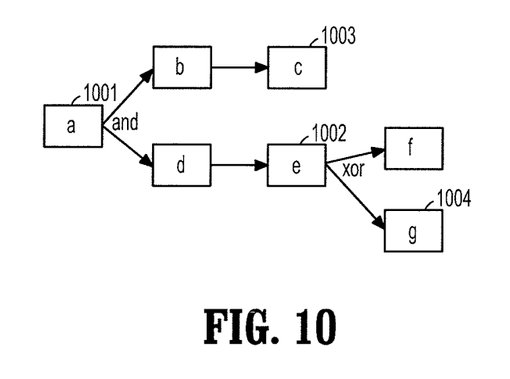
FIG. 10 is a process model with parallel tasks according to an embodiment of the present disclosure.

For example, consider the example in FIG. 10. In FIG. 10, output gate of the task "a" 1001 is "AND" and output gate of the task "e" 1002 is "XOR". Assume two traces "abdce" and "abdefc" have been observed; the question is "would task 'g' be executed?" The last task in both traces is "c" 1003; task "g" 1004 may be executed after task "c" in the first trace but it is not possible that it be executed after task "c" in the second trace. Thus, the state of the trace is not only function of its last executed task but also depends on the path it is taken by the trace.

To define the state space of the Markov chain, assume each edge can be labeled as active (1) and inactive (0). Assume $E \subset V \times V$ is set of edges in the PPM. Then, there are $2^{|E|}$ possible labels for all the edges.

Now, define state of the in-execution task in the PPM by the active edge. All edges by default are inactive. If a task is executed and the output gate is "AND", then all the output edges are activated. Similarly, if a task is executed and the output gate is "XOR" then only one of the output edges is activated. A task is active (or can be executed) if the input gate is "AND" and all the input edges are active or the input gate is "XOR" and one of the input edges is active. The state of the case is defined by active and inactive edges. Thus, the size of state space can be as large as $2^{|E|}$.

However, not all the states are reachable from the starting point of the process model and practically the reachable states are much smaller than potential size of the state space $2^{|E|}$. Also, state space can be decomposed to smaller state spaces.

Transitions among various states can be defined appropriately. There is a transition from states $s_1 \in 2^{|E|}$ to state $s_2 \in 2^{|E|}$, if state $s_2$ can be obtained by executing an active task, "a", in states $s_1$. Note that if the output of the task "a" is "XOR", executing task "a" will activate one of the outgoing edges. Let $p_i$ be the probability of activating the particular edge that transforms $s_1$ to $s_2$. Then, the transition probability between these states would be where be $$\frac{1}{m} p_i;$$

where "m" is the number of active tasks in state $s_1$.

---

Algorithm 4: reachable_states(state s):
Finding reachable state in a process model Input: a state s
Output: set of reachable states
I-  S = φ

---

Algorithm 4: reachable_states(state s):
Finding reachable state in a process model II- For all active tasks "a" in s
   a. Execute "a" and get new state "s0"
   b. S = S ∪ {s_0} ∪ reachable_state(s0)

---

Referring to block 107 of FIG. 1, Kolmogorov backward equations may be used for prediction 108.

Having the Markov Chain with extended space, a probability of executing each task for a given in-execution case may be predicted 108.

Consider the extended state space Markov Chain (eMC). Let "S" be set of reachable states and T be the transition matrix; i.e., $T_{s,t}$ is probability of going from state "s" to "t". Since the eMC models a business process, it has an end state "e" (there is no out going edge from "e" to any other state). Also, assume "A" is a given subset of "S" such that $e \notin A$. Define $g: S \to [0,1]$ as follows.

$g(s)$=probability of visiting $A$ starting from state "$s$".

By definition, $g(s)=1$, $\forall s \in A$ and since "e" is the end state, it is not possible to go to A from e; thus, $g(e)=0$.

For other states $s \in S \setminus A \setminus \{e\}$ $g(s)$ may be written as a linear combination of "g" over other states.

$$g(s) = \sum_{\bar{s} \in S} T(s, \bar{s}) g(\bar{s})$$

There are a total of $n=|S|$ equations and "n" variables ($g(s)$), thus it is possible to compute $g(s)$ exactly by solving following system of linear equation.

$$\begin{cases} g(s) = 1, \forall s \in A \\ g(e) = 0 \\ g(s) = \sum_{\bar{s} \in S} T(s, \bar{s}) g(\bar{s}) \end{cases} \quad (1)$$

Now, assume the probability of executing task "a" is to be determined. Since we assume that a process once begun always completes, task "a" would be executed until completion if it ever gets activated. Thus, define set "A" as follows.

$A = \{s \in S | \text{task "a" is active in state "s"}\}$.

Now, the probability of executing task "a" starting from each state can be computed using Eq. (1).

It may be assumed that the training data set (completed traces log) is fixed; however, in a practical system, new traces may be added to the system over time. Thus, an updating rule may be implemented such that the predictions are updated as new traces come in. It should also be noted that the update methods described herein are applicable to both the PPM and the decision nodes. Thus, in a case where only the PPM is determined, the update methods may still be applied.

According to an embodiment of the present disclosure, different approaches are possible in updating the PPM and prediction. In one approach all traces are treated similarly. In another approach recent traces may be considered more valuable. If all traces are considered equally important, then one can use the frequency of events as an approximation to their probabilities.

However, if traces are weighted, e.g., with more recent traces having greater weight, then a window (weight function) may be defined for the traces. For example, a decreasing function w:N→R⁺ may define the weights over different traces. Function "w" is the window function. The trace of time "t" is weighted by w(t/h); where "h" is the windows size. As "h" decreases the importance of old traces also decreases.

When the underlying process model and transition probabilities change, considering a windows size helps in keeping the model updated. For example, since weights of old traces are approach zero, they do not have any effect on predictions. However, finding an appropriate window (window size) is not trivial. One well-known method for finding the window size is Intersection of Confidence Intervals (ICI). ICI is one example of a method applicable in the context of weighting traces for the change detection in the case management.

Ant colony Optimization (ACO) is another method for keeping the model up to date and decreasing effect of the old traces. The transition vector at vertex v is updated by incrementing the probability associated with neighbor node k, and decreasing (by normalization) the probabilities $\phi_v^s$ associated with other neighbor nodes s, such that s≠k. The update procedure modifies the probabilities of the various paths using a reinforcement signal r, where r∈[0,1]. The transition vector value $\phi_v^k(t)$ at time t is increased by the reinforcement value at time t+1 as follows:

$$\phi_v^k(t+1)=\phi_v^k(t)+r(1-\phi_v^k(t)) \qquad (2)$$

Thus, the probability is increased by a value proportional to the reinforcement received, and to the previous value of the node probability. Given the same reinforcement, smaller probability values are increased proportionally more than larger probability values. The probability $\phi_v^q$ for all neighbor nodes where q∈N(v) where q≠v is decayed. The decay function helps to eliminate edges (and consequently nodes) in G that cease to be present in the process execution traces and are thus indicative of changes in the process model. These |N(v)|−1 nodes receive a negative reinforcement by normalization. Normalization is needed to ensure that the sum of probabilities for a given pheromone vector is 1.

$$\phi_v^q(t+1)=\phi_v^q(t)\cdot(1-r), q\neq k \qquad (3)$$

Note that the reinforcement parameter here is similar to the windows size "h". If "r" is chosen close to one, older traces are strongly ignored, similar to putting "h" very small. And choosing "r" close to zero is similar to putting more weight on old traces.

It is to be understood that embodiments of the present disclosure may be implemented in various forms of hardware, software, firmware, special purpose processors, or a combination thereof. In one embodiment, a method for predictive analytics for document content driven processes may be implemented in software as an application program tangibly embodied on a computer readable medium. As such the application program is embodied on a non-transitory tangible media. The application program may be uploaded to, and executed by, a processor comprising any suitable architecture.

Figure 11:
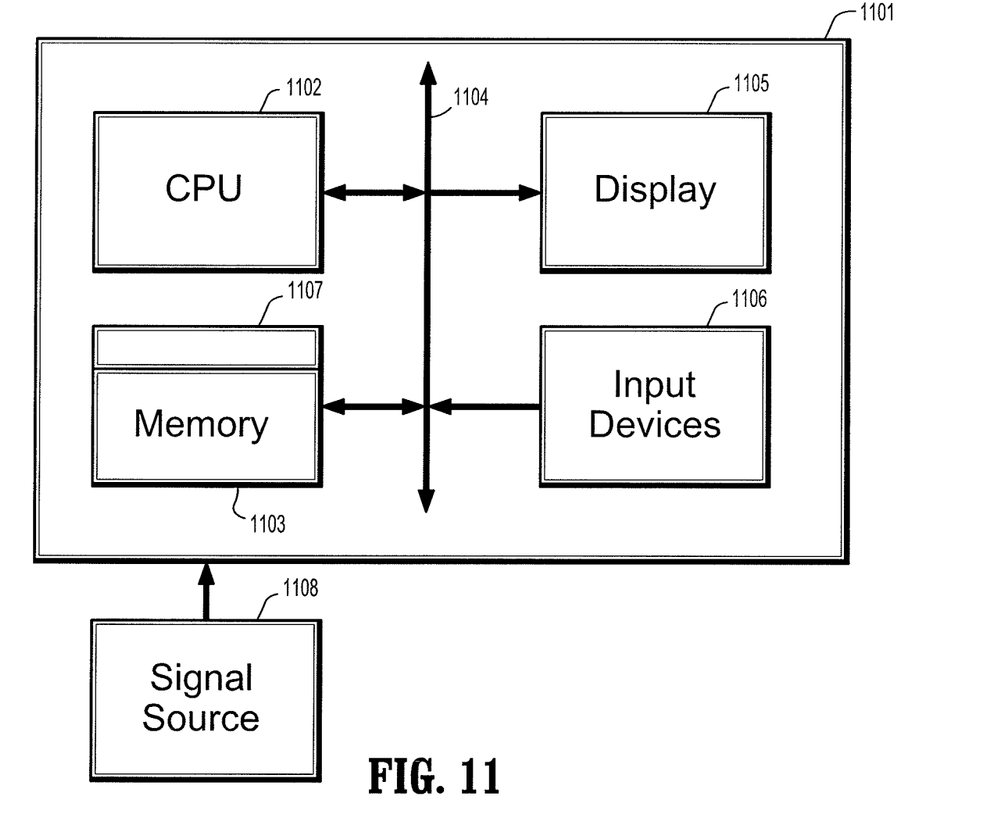
FIG. 11 is a diagram of a computer system for implementing an end-to-end prediction according to an embodiment of the present disclosure.

Referring to FIG. 11, according to an embodiment of the present disclosure, a computer system 1001 for implementing predictive analytics for document content driven processes can comprise, inter alia, a central processing unit (CPU) 1102, a memory 1103 and an input/output (I/O) interface 1104. The computer system 701 is generally coupled through the I/O interface 1104 to a display 1105 and various input devices 1106 such as a mouse and keyboard. The support circuits can include circuits such as cache, power supplies, clock circuits, and a communications bus. The memory 1103 can include random access memory (RAM), read only memory (ROM), disk drive, tape drive, etc., or a combination thereof. The present invention can be implemented as a routine 1107 that is stored in memory 1103 and executed by the CPU 1102 to process the signal from the signal source 1108. As such, the computer system 1101 is a general-purpose computer system that becomes a specific purpose computer system when executing the routine 1107 of the present invention.

The computer platform 1101 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for predictive analytics for document content driven processes, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable non-transitory storage medium embodying instructions executed by a plurality of processors for predictive analytics in a semi-structured business process, the method comprising:

receiving execution traces generated by one or more computer system elements generated during the execution of a plurality of tasks of the semi-structured business process, wherein an outcome of the execution of each of the plurality of tasks is dependent upon one or more documents containing document content values, at least one of the execution traces including the document content value, wherein the document content value influenced the execution of the plurality of tasks;

determining a process model from the execution traces, the process model comprising tasks at nodes of the semi-structured business process, wherein the determined process model includes all possible execution sequences of the semi-structured business process;

determining a probabilistic graph including a probability, at each of the tasks of the semi-structured business process, for advancing to each of the other tasks of the semi-structured business process, wherein the probability is influenced by the document content value; and combining the process model and probabilistic graph to determine a probabilistic process model including probabilities and strengths of transitions between each and every task of the semi-structured business process.

2. The computer readable storage medium of claim 1, wherein the probabilistic process model comprises nodes representing the tasks and edges between the nodes associated with respective probabilities of a child node occurring given an occurrence of a parent node.

3. The computer readable storage medium of claim 1, wherein the process model identifies at least one of hidden tasks that identify exclusive versus parallel paths, nodes where the business process splits, nodes where the business process joins, edges where the business process execution is parallel, and edges where the business process execution is exclusive.

4. The computer readable storage medium of claim 1, wherein the process model identifies loops in the semi-structured business process.

5. The computer readable storage medium of claim 1, the method further comprising determining a probability distribution at a decision node based on available document contents at that decision node, wherein the probability distribution gives a probability of the semi-structured business process advancing from a task corresponding to the decision node to one or more children tasks.

6. The computer readable storage medium of claim 5, the method further comprising:
receiving a status and content of an executing case instance of the business process;
updating the probability distribution using the status and the content; and
updating at least one probability of the probabilistic business process model using an updated probability distribution.

7. The computer readable storage medium of claim 5, wherein the content includes document content values as attributes in an instance of the business process.

8. The computer readable storage medium of claim 5, the method further comprising:
receiving a status of an executing case instance of the business process;
updating the probability distribution using the status; and
updating at least one probability of the probabilistic business process model using an updated probability distribution.

9. The computer readable storage medium of claim 1, the method further comprising constructing an extended probabilistic process model describing relations between the tasks of the business process based on the probabilistic process model, wherein the extended probabilistic process model enables predictive analytics in the business process based on content associated with the tasks.

10. A computer readable non-transitory storage medium embodying instructions executed by a plurality of processors for predictive analytics in a semi-structured business process, the method comprising:
receiving execution traces generated by one or more computer system elements generated during the execution of a plurality of tasks of the semi-structured business process, wherein an outcome of the execution of each of the plurality of tasks is dependent upon one or more documents containing document content values, at least one of the execution traces including the document content value, wherein the document content value influenced the execution of the plurality of tasks;
determining a process model from the execution traces, the process model comprising tasks at nodes of the semi-structured business process and assigns semantics to the nodes and edges connecting the nodes, wherein the determined process model includes all possible execution sequences of the semi-structured business process;
determining a probabilistic graph including a probability at each and every task of the plurality of tasks of the semi-structured business process for advancing to each of the other tasks of the semi-structured business process, wherein the probability is influenced by available document contents at respective decision nodes;
combining the process model and probabilistic graph to determine a probabilistic process model including probabilities and strengths of transitions between each and every task of the semi-structured business process;
determining a probability distribution at a decision node based on available document contents at that decision node, wherein the probability distribution gives a probability of the semi-structured business process advancing from a task corresponding to the decision node to one or more children tasks; and
updating the probabilistic process model using probabilities derived by the probability distribution and predicting one of a subsequent task in an execution the business process given a current task or any task in the business process given the probabilistic process model.

11. The computer readable storage medium of claim 10, the method further comprising:
receiving a new execution trace;
re-determining the probability distribution for new execution trace; and
updating the probabilistic process model using probabilities derived by a re-determined probability distribution.

12. The computer readable storage medium of claim 10, the method further comprising constructing an extended probabilistic process model describing relations between the tasks of the business process based on the probabilistic process model, wherein the extended probabilistic process model enables predictive analytics in the business process based on content associated with the tasks.

13. A computer readable non-transitory storage medium embodying instructions executed by a plurality of processors for updating a probabilistic process model (PPM) of a semi-structured business process, the method comprising:
receiving the PPM and at least one probability distribution corresponding to a decision node of the PPM, wherein the received PPM includes all possible execution sequences of the semi-structured business process, wherein the received PPM is generated from a process model (PM) and a probabilistic graph including a probability, at each and every task of the semi-structured business process, for advancing to each of the other tasks of the semi-structured business process, and wherein the PM is derived from execution traces generated by one or more computer system elements generated during execution of a plurality of tasks of a semi-structured business process;
receiving a status and content of an executing case instance of the business process; and
updating at least one probability of the PPM using the probability distribution and the received status and content of said executing case instance of the business process.

14. The computer readable storage medium of claim 13, wherein updating further comprises mapping the PPM to an extended probabilistic process model with additional nodes representing states achievable through parallel paths in the PPM.

15. The computer readable storage medium of claim 13, the method further comprising constructing an extended probabilistic process model describing relations between tasks of the business process based on an updated probabilistic process model, wherein the extended probabilistic process model enables predictive analytics in the business process based on content associated with the tasks.

16. The computer readable storage medium of claim 13, wherein the PPM comprises nodes representing the tasks and edges between the nodes associated with respective probabilities of a child node occurring given an occurrence of a parent node.

* * * * *